(No Model.) 3 Sheets—Sheet 1.

F. M. WOLF.
VELOCIPEDE.

No. 391,499. Patented Oct. 23, 1888.

WITNESSES:
Fred G. Dieterich.
Geo. F. Brock.

INVENTOR,
Francis M. Wolf.
BY Munn & Co.
ATTORNEYS.

(No Model.) 3 Sheets—Sheet 3.

F. M. WOLF.
VELOCIPEDE.

No. 391,499. Patented Oct. 23, 1888.

WITNESSES:
Fred G. Dieterich
Geo. F. Brock

INVENTOR,
Francis M. Wolf
BY Munn & Co
ATTORNEYS.

UNITED STATES PATENT OFFICE.

FRANCIS MILLER WOLF, OF SPRINGFIELD, MISSOURI.

VELOCIPEDE.

SPECIFICATION forming part of Letters Patent No. 391,499, dated October 23, 1888.

Application filed August 8, 1888. Serial No. 282,276. (No model.)

*To all whom it may concern:*

Be it known that I, FRANCIS MILLER WOLF, residing at Springfield, in the county of Greene and State of Missouri, have invented certain new and useful Improvements in Riding-Machines, of which the following is a specification.

My invention relates to a vehicle of that class intended for propulsion by the occupant, and has for its object to provide a vehicle of a durable and inexpensive character, which may be propelled at a high rate of speed on ordinary roads, and which may be easily controlled and readily steered in any direction by the occupant.

The invention consists in certain novel features of construction and combination of parts of the vehicle, as will be hereinafter fully described in the specification, and particularly pointed out in the claims, reference being had to the accompanying drawings, in which—

Figure 1:
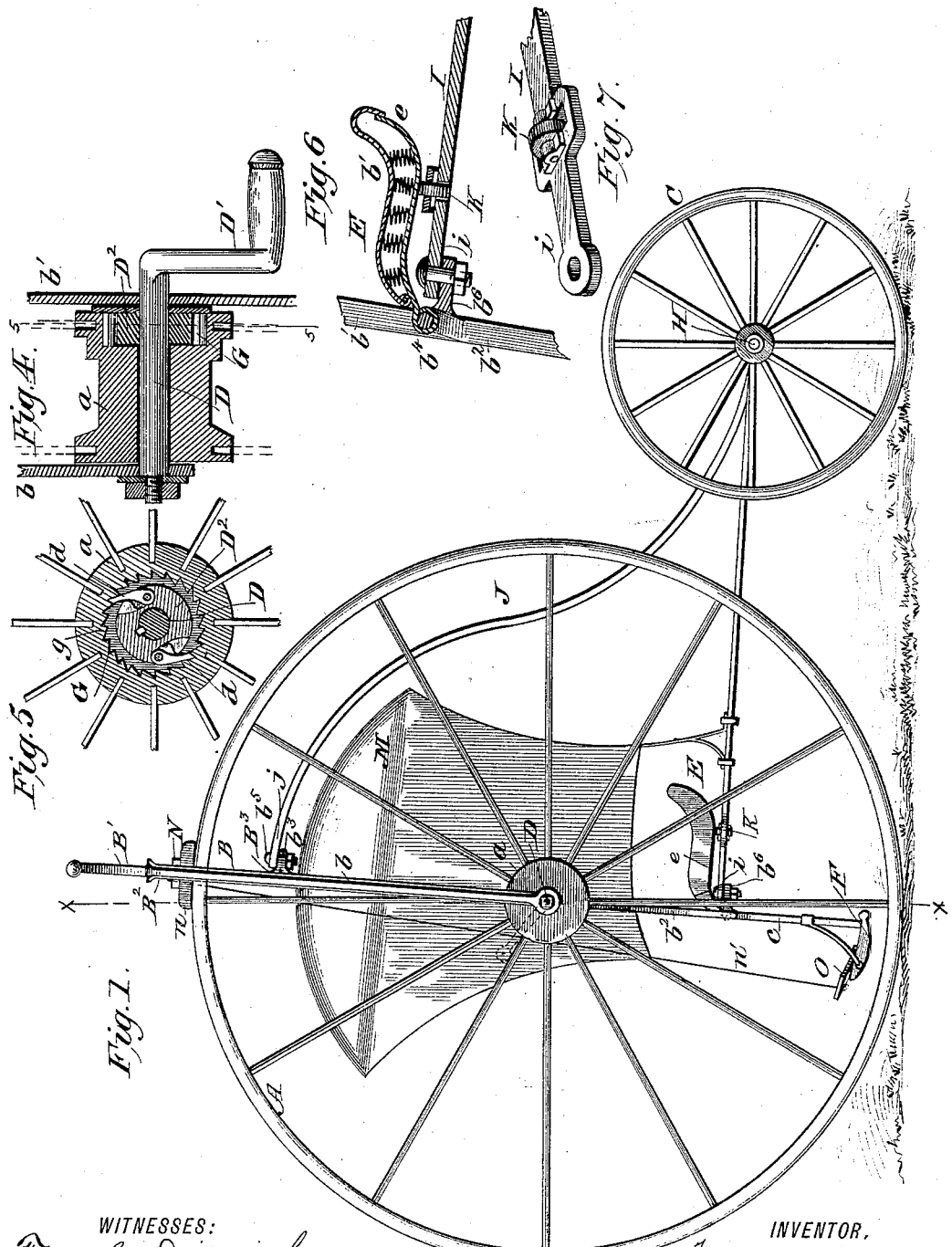
Figure 2:
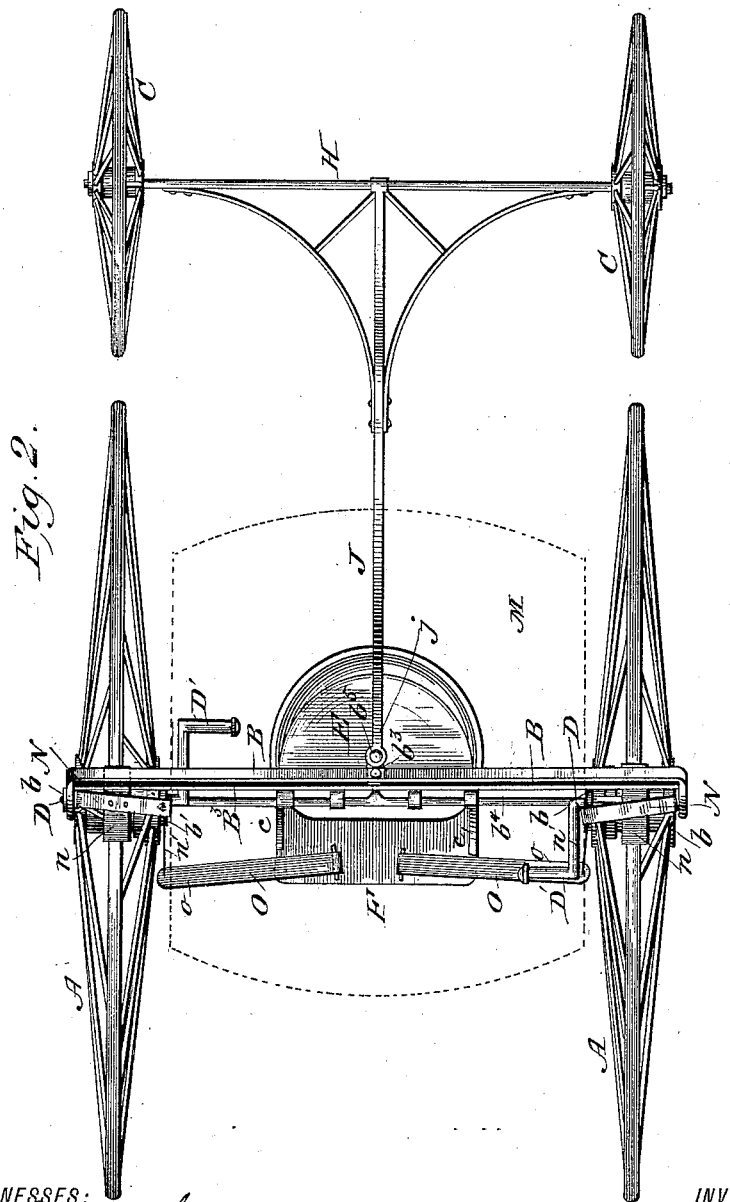
Figure 3:
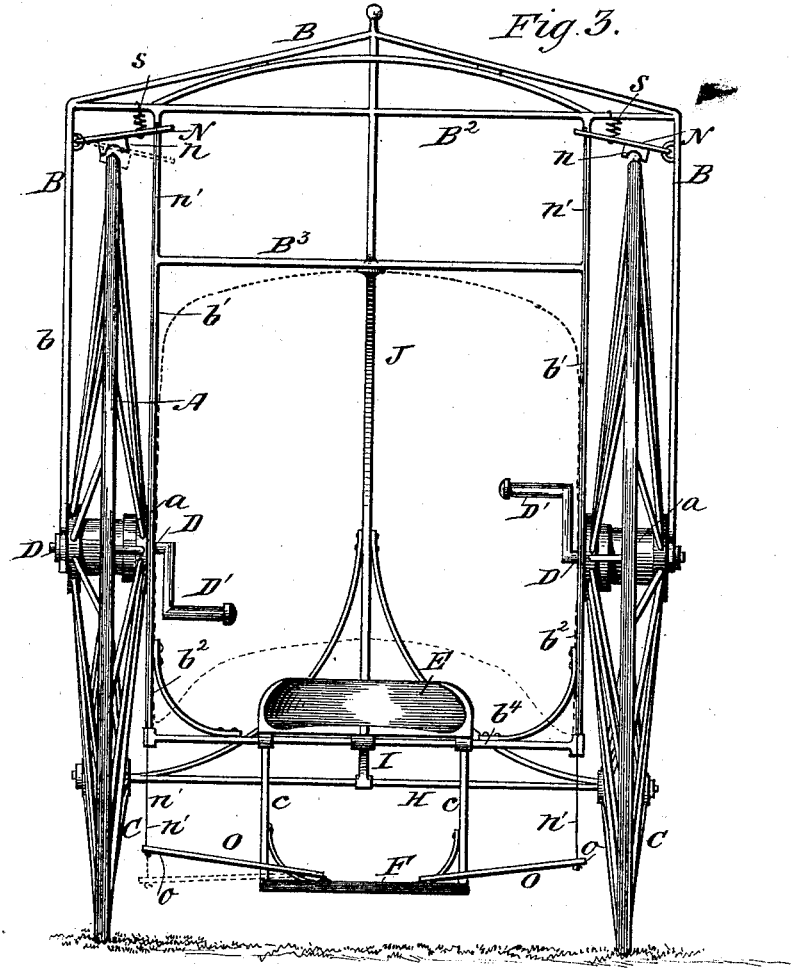
Figure 8:
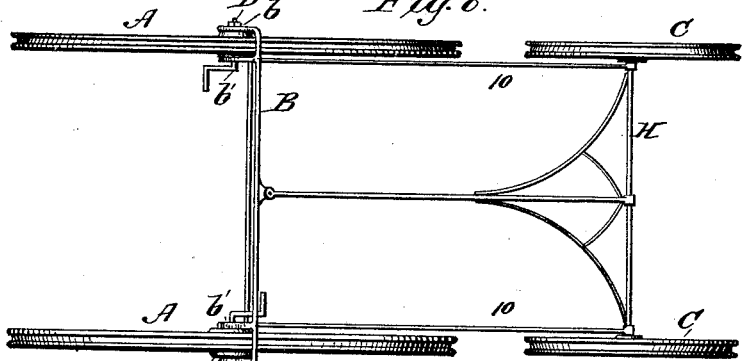

Figure 1 is a side elevation of my improved riding-machine. Fig. 2 is a top plan view thereof with the canopy removed. Fig. 3 is a front elevation of the same. Fig. 4 is a detail cross-section of one of the crank-axles and wheel-hubs. Fig. 5 is a section on the line 5 5, Fig. 4. Fig. 6 is a detail section of the saddle and its connection with the frame. Fig. 7 is a detail view of the front end of the reach or connecting-bar, and Fig. 8 is a view showing the machine-frame as adapted for use on railroads.

In the practical construction of my machine the same is composed of two large drive-wheels, A A, usually six or seven feet high, adjusted to a framing, B, the construction of which will be presently explained, and two smaller wheels, C C, attached to the said frame, thus forming a four-wheeled vehicle.

The frame B consists of the upright or yoke portion B', connected at the top by cross-bars $B^2$ $B^3$. The vertical bars $b$ $b'$ of the yoke B' extend one on each side of the drive-wheels A, and have journaled at their lower ends the axles D of the wheels A. The inner bar, $b'$, is extended downward, as at $b^2$ $b^2$, and is connected with a cross-bar, $b^4$, to which bar $b^4$ are attached the saddle E and foot-rest F. The axles D are formed independent of the wheels A, and are arranged within the hubs of said wheels in a manner as is clearly shown in Figs. 4 and 5. By reference to said figures it will be seen that the axles D are formed with crank-handles D' and with a pawl-disk, $D^2$, keyed thereon, arranged to operate in an interior toothed recess, G, formed in the hub $a$ of the wheels A. By this construction it will be observed that when the operator grasps the crank-handles and turns them in a forward direction the pawls $d$ will engage the teeth $g$, and thus propel the wheels forward. When the machine has received a sufficient momentum, or is on a downgrade, the crank-axles may remain stationary, and the toothed hub will revolve over the pawls in a manner as is well understood in riding-machines having ratchet driving mechanism.

The smaller wheels, C C, are supported on the axle H, which is pivotally connected with the front frame, B, by means of the connecting bar or reach I and the backbone J. The front end, $j$, of the backbone J is connected to a rearward extension or lug, $b^3$, of the cross-bar $B^3$ by means of a pivot-bolt, $b^5$, as shown in Fig. 1. The front end, $i$, of the reach I is pivotally connected to an extension or lug, $b^6$, on the cross-bar $b^4$. The backbone and connecting bar or reach are suitably braced to the rear axle, as clearly shown in Fig. 2 of the drawings.

By connecting the rear wheels to the main frame in the manner described it will readily appear that the machine may be quickly and easily steered, and by arranging the backbone J to the main frame, as shown, the machine is thereby thoroughly braced and strengthened, thereby adapting the same to use for all kinds of roads. The saddle or seat has a hinged connection with the cross-bar $b^4$ at its forward end, and extends rearwardly and supported at such rear end upon the reach I.

The saddle E, which is illustrated in detail, Fig. 6, is formed of the base portion $e$, which is hinged at its forward end to the cross-bar $b^4$ and the spring-seat section $b'$. In supporting the rear portion of the saddle upon the reach I it is preferred to support it upon a roller, K, journaled in the reach-bar I, and arranged in contact with the base $e$ of the saddle. The advantages of resting the rear end of the seat on the roller K will be readily understood, the same permitting the easy movement of the seat when the front frame has a lateral motion, when it deviates from a straightforward course. Extending downwardly from the cross-bar $b^4$ are two short bars, $c\ c$, which support the foot-rest F.

In adjusting the seat and front rest it is intended that the seat shall hang on a line of about twenty inches below the line of the hubs of the drive-wheels and within a short distance of the crank-axles, so they may be in easy reach of the operator. The foot-rest is arranged about six to eight inches above the ground. The seat is placed to the rear of the line running perpendicular through the axles, as shown by $x$, Fig. 1, in order to enable the operator of the machine to handle the cranks to a better advantage, for were it farther toward the front it would result in getting the handles of the crank-axles too near the body of the rider.

The wheels may be made of wood or metal, and are of a gage to track with ordinary road-wagons; or they may be constructed with a flanged tire, so as to adapt them to travel on railroad-tracks. When the machine is arranged to travel on a railroad, it is preferred to rigidly brace the front frame with the rear axle, as shown at 10, Fig. 8.

M indicates a canopy or buggy-top covering, which is supported upon the reach-bar I and arranged beneath the backbone J. This canopy may be so arranged as to be supported by means of its connection to the reach-bar; or it may be suspended from the cross-bar $B^3$ and its sides connected with the frame in any desired or suitable manner.

Short cross-bars N are hinged to the outer vertical bars, $b$, at the upper ends thereof, which bars extend across the tops of the drive-wheels A, and are provided on their under faces with brake-shoes $n$, which are adapted at the will of the rider to be brought into contact with the drive-wheels A, when desired. The brake-bars N are normally held from contact with the drive-wheels by means of springs S S. (See Fig. 3.)

O represents levers, hinged at one end to the foot-rests and extending laterally therefrom, as at $o$. Said levers are connected with the brake-bars N by means of the straps or cords $n'$. By this arrangement it will be observed that the driver may readily (by means of his feet) apply the brake to either or both of the drive-wheels when necessary.

By constructing a riding-machine in the manner described superior advantages are presented over machines of this class now in use. Greater speed can be acquired, it can be easily mounted or dismounted, is perfectly safe, and is propelled by the most expert members of the body. It may readily be steered by changing the speed of the two drive-wheels, and by means of the brake mechanism quickly brought to a stop.

By forming the drive-wheels of extraordinary height very great speed may be obtained, and yet enable the machine to travel freely over cloggy or stony roads and uneven surfaces with apparent ease, the canopy affording a protection from the rain or sun's rays and at the same time presenting a neat appearance.

By arranging the main frame in the manner described, and connecting the side bars by the cross-bars $B^2\ B^3$, and extending the frame over the drive-wheels, the weight of the rider and frame of the machine hang with equal weight on each end of the drive-wheel spindles or hubs, thereby avoiding any irregular or uneven wear of the wheels upon the axles or spindles.

The frame-work of the machine may be made of either light wood or metal, preferably gas-pipe or hollow iron or steel.

While I have shown two hind wheels attached to the main frame, it is manifest that but one wheel may be used without changing the novel construction of the machine.

Having thus described my invention, what I claim, and desire to secure by Letters Patent, is—

1. In a riding-machine, the combination, with the drive-wheels A, provided with crank-axles D, and the frame B, supported upon said axles and extending above and over the wheels A, and provided with an extension below the axles of the wheels, said extension supporting the saddle and foot-rest, of the rear supporting-wheels and their connection to the main frame, said connection consisting of an axle, H, a reach-bar, I, extending forward and connected with the main frame below the axles D, and a backbone, J, extending upward and connected to the main frame above the height of the propeller, said reach and backbone connected with the rear axle, H, substantially as shown and described.

2. In a riding-machine, the combination of the main frame B', the driving-wheels journaled therein, the seat and foot-rest supported on said frame, the rear wheels, the backbone J, pivotally connected to frame B near its upper end, the reach I, pivotally connected to the main frame below the axle, said backbone and reach connected with the rear-wheel axle H, and a canopy arranged above and over the seat and below the backbone, substantially as and for the purpose described.

3. In a riding-machine, the combination of the frame B, said frame consisting of the vertical bars $b\ b'$, the bars $b'$, formed with downward extensions $b^2$, the cross-bars $B^2\ B^3\ b^4$, the rear-wheel frame connected to the bars $B^3$ and $b^4$ of the main frame, the saddle, and foot-rest connected to the bar $b^4$ of the drive-wheels A, provided with crank-axles D, said wheels journaled between the arms $b\ b'$ of the frame B, substantially as shown and described.

4. The combination, with the cross-bar $b^4$ of the frame B, and the reach I, connected to said cross-bar, of the saddle E, provided with a hinged connection at its front end to the cross-bar $b^4$, its rear end adapted to rest on the reach I, substantially as and for the purpose described.

5. The combination, with the cross-bar $b^4$ and the reach I, pivotally connected to said cross-bar, said reach provided with a friction-pulley, K, in its forward end, of the saddle E, having a hinged connection at its forward end with the cross-bar $b^4$, its rear end projecting over the reach I and resting on the roller K, substantially as and for the purpose described.

6. The combination, with the bar $b^4$ of the frame, and the reach I, pivotally connected thereto, of the saddle E, hinged at its forward end to the bar $b^4$, the rear end supported on the reach I, and the foot-rest F, suspended from and connected to the bar $b^4$, substantially as shown and described.

7. In a riding-machine, the combination, with the main frame B, the seat and foot-rest supported at the lower end of the same, and the drive-wheels A, journaled in said frame, of the brake device, said device consisting of cross-bars N, hinged at their outer ends to the bars $b$ and extending over the wheels A and provided with brake-shoes $n$, levers O, hinged at one end to the foot-rest, strap-connection $n'$ between levers O and bars N, and springs S, for normally holding the brake-shoes from contact with the wheels A, substantially as and for the purpose described.

FRANCIS MILLER WOLF.

Witnesses:
W. E. BOWDEN,
FALCOM L. WEIR.